United States Patent
Wang et al.

(10) Patent No.: US 7,711,361 B2
(45) Date of Patent: May 4, 2010

(54) METHOD AND SYSTEM FOR DISTRIBUTED ROAMING SERVICES FOR MOBILE USERS ON WIRELESS MESH NETWORKS

(75) Inventors: Xiao-Dong Frank Wang, Saratoga, CA (US); Fuyong Zhao, San Jose, CA (US); Fang Wu, Pleasanton, CA (US)

(73) Assignee: Azalea Networks, George Town (KY)

( * ) Notice: Subject to any disclaimer, the term of this patent is extended or adjusted under 35 U.S.C. 154(b) by 149 days.

(21) Appl. No.: 11/286,069

(22) Filed: Nov. 23, 2005

(65) Prior Publication Data
US 2006/0234701 A1   Oct. 19, 2006

Related U.S. Application Data

(60) Provisional application No. 60/630,267, filed on Nov. 24, 2004.

(51) Int. Cl.
*H04W 4/00* (2009.01)
*H04W 36/00* (2009.01)

(52) U.S. Cl. .................. 455/432.1; 455/436; 455/442; 455/443; 370/331; 370/338; 370/328; 370/401

(58) Field of Classification Search .............. 455/432.1, 455/436, 442, 443, 437, 438, 439; 370/331, 370/338, 328, 401
See application file for complete search history.

(56) References Cited

U.S. PATENT DOCUMENTS

| | | | |
|---|---|---|---|
| 7,130,286 B2 * | 10/2006 | Koodli et al. | 370/331 |
| 2002/0191560 A1 * | 12/2002 | Chen et al. | 370/331 |
| 2004/0066764 A1 | 4/2004 | Koodli et al. | |
| 2004/0077335 A1 * | 4/2004 | Lee et al. | 455/410 |
| 2006/0089148 A1 * | 4/2006 | Zhao et al. | 455/447 |

OTHER PUBLICATIONS

PCT/US05/42557—PCT Search Report and Written Opinion, Jul. 30, 2008, Azalea Networks.
C. Perkins, Ed. IP Mobility Support for IPv4, The Internet Society, Network Working Group RFC 3220, Jan. 2002.

* cited by examiner

*Primary Examiner*—George Eng
*Assistant Examiner*—Wesley L Kim
(74) *Attorney, Agent, or Firm*—Orrick, Herrington & Sutcliffe LLP

(57) ABSTRACT

A method and system for distributed roaming in a wireless mesh network are disclosed. Cells are able to track and predict a users movement throughout the network. The user's roaming profile is forwarded to predicted future cells before the user actually enters those cells. When the user enters a new cell, roaming is completed without communication to any other cells. Thus, handoff time is reduced and users may more seamlessly move throughout the network coverage area.

22 Claims, 4 Drawing Sheets

METHOD AND SYSTEM FOR DISTRIBUTED ROAMING SERVICES FOR MOBILE USERS ON WIRELESS MESH NETWORKS

The present application claims the benefit of and priority to U.S. Provisional Patent Application No. 60/630,267 entitled "Distributed Roaming Services For Mobile Users on Wireless Mesh Networks," filed on Nov. 24, 2004, which is incorporated herein by reference.

FIELD OF THE INVENTION

The field of the invention relates generally to wireless networks and more particularly to a method and system for distributed roaming services tailored for wireless mesh networks.

BACKGROUND

Many wireless mesh networks have the following characteristics in common: highly dynamic, autonomous, peer-to-peer, multi-hop, limited bandwidth and computing power, etc. Wireless mesh networks are highly dynamic for two reasons. First, the routers themselves may move (e.g. in mobile or hybrid wireless mesh networks), generating quick response times to topological changes. Second, even if the routers themselves do not move (e.g. in fixed wireless mesh networks), the radio link qualities can change very quickly because of interference, geographical and environmental factors. Traditional routing protocols (e.g. OSPF, RIP), designed for wired infrastructures, cannot handle such quick changes in signal strength. Many of the ad hoc routing protocols (e.g. AODV) lack the ability to flexibly adapt to radio link quality changes.

Wireless networks are becoming increasingly common in peoples' lives. The most popular wireless networks to date are mobile phone networks. Such networks are typically broken down into a number of "cells," as indicated by the term "cellular phone networks." Each cell has a set of antennae that send and receive signals to and from cell phone users. Communication lines interconnect the cells to form a cellular network. A commonly-used communication line is a fiber optic line, though alternatives are widely accepted in the field.

In a cellular network, when a user moves from one cell to another, their mobile phone call can continue communication only if a connection to one or more antennae is maintained. The process of transferring a user's connection from one cell to the next is called "roaming." Roaming is essential to enable a user to stay connected while moving across different cells without dropping calls.

Cellular networks are traditionally not built as "mesh," but in some form of hierarchical topological. (e.g. a tree topology, or a set of trees) A mesh, on the other hand, is a network where every cell is virtually connected to every other cell in the network. An example of a mesh is a grid map or the Internet. A wireless mesh network consists of cells interconnected by wireless backhaul such that each cell is in virtual communication with every other cell. Wireless mesh networks can also have gateways connected to wired networks. With the popularity of IEEE 802.11 wireless devices, wireless mesh networks have become increasingly popular. An 802.11 mesh network can incorporate inexpensive and relatively low powered 802.11 devices (access points, routers, etc) to form a high throughput and reliable distributed network. The advantages of such a network are analogous to those in distributed PC networks, which generate enormous computing power beyond that obtained with independent PC's.

Roaming is the process by which a user switches between cells in a wireless mesh network. In a large wireless mesh network capable of handling Voice-Over-IP (VoIP) traffic, a roaming solution needs to be scalable, reliable, and provide fast handoff between different cells. Such a roaming solution should scale to at least thousands of network cells, though the limit for future applications is unpredictable. The key to scalability is lower roaming overhead, reducing the burden on the system at each handoff. The wireless mesh network should also be resilient to cell failures in a way similar to the Internet. This resiliency requires the network to take full advantage of the connectivity across the entire mesh. At present, the latency needs to be less than 50 ms to be undetectable to VoIP users.

Existing roaming solutions fall short of these requirements. Roaming solutions in mobile cellular networks cannot be applied because they require hierarchical tree-like topologies. A recent proposal termed "micro-mobility" utilizes solutions such as the Cellular IP and Hawaii protocols derived from cellular phone networks. Micro-mobility solutions are typically designed for a strictly hierarchical network. A hierarchical network introduces bottlenecks due to poor load balancing and is vulnerable to cell failure, among other problems. The main weakness of hierarchical networks, though, is the lack of scalability. Hierarchical networks require significant cache and exchange state information storage among duplicative cells in the system. The amount of information exchanged and maintained grows exponentially with the size of the network and with the amount of roaming activities among users. Thus, such a hierarchical network is not scalable, and becomes impracticable as the number of cells increases.

Another prominent solution (and IEEE standard) on IP networks is called Mobile IP, created by the Internet Engineering Task Force. Mobile IP is scalable, but can suffer from long handoff latency due to the way it forwards data to a mobile user. Optimization techniques to reduce handoff latency require changes on client software, which could be a serious impediment to user adoption.

Prior wireless mesh networks enable a user to switch between mesh routers. When a user device senses that a stronger signal is available than the one currently being used to access the network, a roaming process enables the device to switch to the stronger signal. To roam, the device must contact a cell, sometimes called a home agent, that contains the user's roaming profile. A home agent is typically a server, and resides somewhere within the entire network. To contact the home agent, the user device may have to travel long paths through a multitude of cells. Further, each time the user roams, the home agent must be contacted. This introduces long delays and signal degradation from the users end.

SUMMARY

A method and system for distributed roaming in a wireless mesh network are disclosed. In one embodiment, a user's roaming profile is obtained from the permanent home agent prior to the user entering a new cell. The network is able to track a users movement across cells, and to predict the users next movement. The roaming profile is forwarded to one or more cells prior to the users movement into one of those cells. Once the user enters a new cell, the new cell completes the roaming process in communication with the old cell. This handoff is much quicker than communicating with the Permanent Home Agent.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings illustrate the preferred embodiment of the presently disclosed invention. Together with the Summary above and the Detailed Description of the Preferred Embodiment below, the drawings serve to explain and teach the principles of the present invention.

DETAILED DESCRIPTION OF THE PREFERRED EMBODIMENT

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of wireless networks and computer systems. These wireless network descriptions and representations are the means used by those skilled in the wireless networking arts to most effectively convey the substance of their work to others skilled in the art. A wireless network is here, and generally, conceived to be a system for communications among two or more systems using radio waves as a transmission medium. Usually, though not necessarily, the information communicated between systems takes the form of packets of information. Furthermore, for reasons of common usage, the components of the packets are referred to as bits, values, elements, symbols, characters, terms, numbers, or the like.

The present invention relates to an apparatus for performing the operations herein. This apparatus may be specially constructed for the required purposes, or it may comprise a general-purpose system selectively activated or reconfigured by a program stored in the system. Such a program may be stored in a computer readable storage medium, such as a disk drive, optical disk drive, CD-ROM, magnetic-optical disk drive, read-only memory, random access memory, EPROM, EEPROM, magnetic or optical cards, or any other type of media suitable for storing electronic instructions and coupled to a system bus.

The methods presented herein are not inherently related to any particular system or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
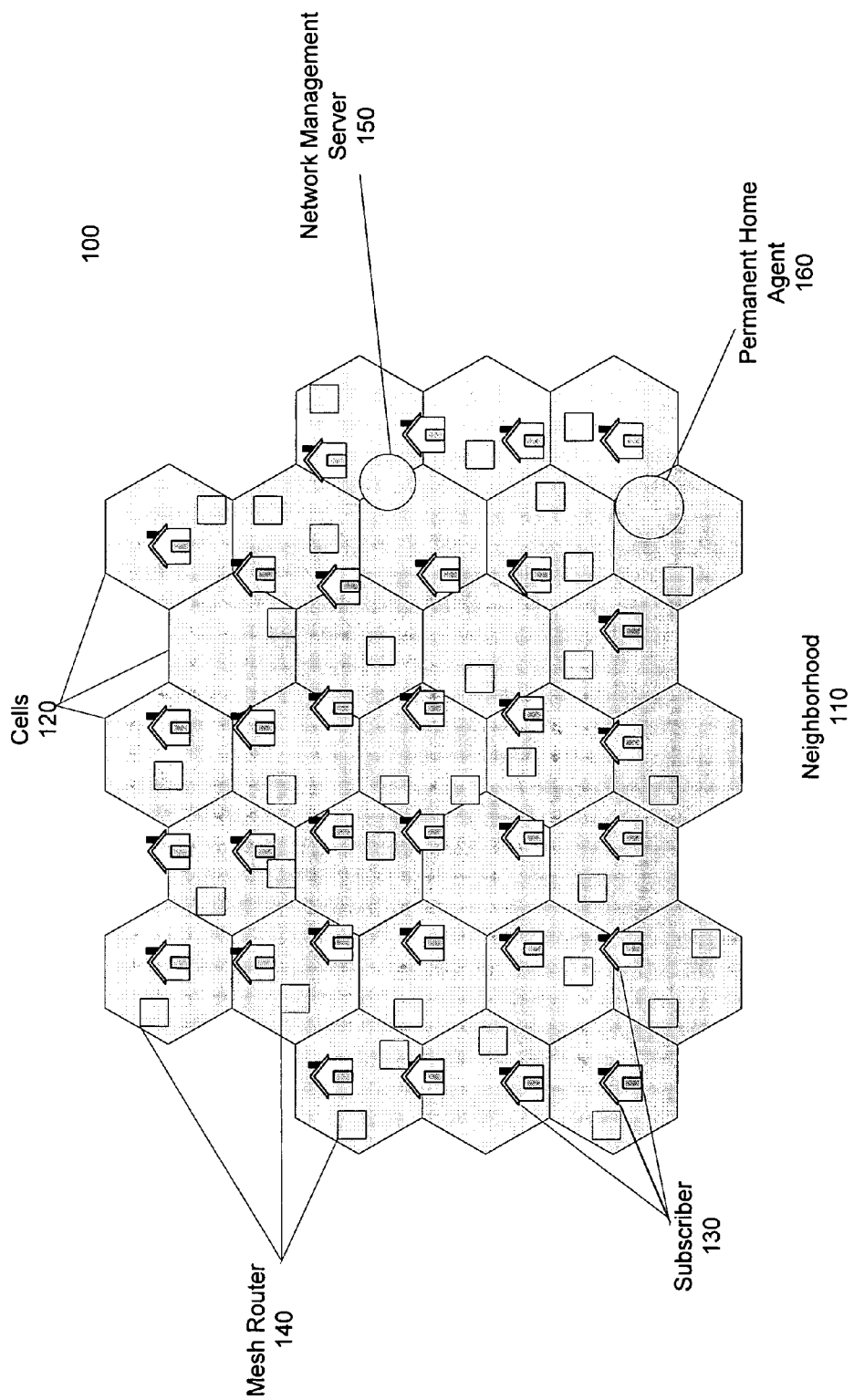
FIG. 1 illustrates a block diagram of an exemplary wireless mesh network according to one embodiment of the present disclosure.

The present method and system for distributed roaming services includes an adaptive, distributed, proactive roaming solution designed for wireless mesh networks. FIG. 1 illustrates an exemplary wireless mesh network according to one embodiment of the present invention. The mesh network 100 may be part of a wireless network and operate on a region such as neighborhood 110. According to one embodiment, the neighborhood 110 is divided into a number of individual cells 120, wherein each cell 120 includes none, one, or more than one subscriber 130 to the wireless mesh network 100. A cell 120 may or may not encompass a subscriber 130 because a particular cell may be situated such that no subscribers 130 happen to be located within its area at any given moment. The network also contains one or more permanent home agents 160 for each user, which assist in roaming when the user roams from one cell into a new cell 120.

The physical boundaries of each cell 120 are only representational of a typical network. Each cell 120 is not necessarily the same size or shape as any other cell 120, though each cell 120 is in communication with each of the cells 120 neighboring it. Thus, each particular cell 120 must have an overlapping border with all of its neighboring cells 120.

According to one embodiment, a subscriber 130 is a computer system authorized to access the wireless network 100. A subscriber 130 must be situated within the network coverage area, and may be located anywhere within the area, such as: within a home, a car, an office, etc.

In addition to a mesh network, it is to be appreciated that other systems employing the various teachings herein may also be used to practice the various aspects of the present invention, and as such are considered to be within its full scope.

Each cell 120 includes at least one mesh router 140 that may be either fixed or mobile. A mesh router 140 communicates with exemplary subscribers 130. According to one embodiment, the subscribers 130 have a subscriber account with the service provider to access mesh network 100 through a mesh router 140. These subscribers 130 may include, for example, a wireless personal digital assistant (PDA), a wireless local area network (LAN) router, or a wireless laptop. Such devices with wireless network capabilities are well-known in the art, and are widely available at a number of consumer retailers. Although a wireless PDA, a wireless LAN router, and a wireless laptop are described, any device with wireless capability may be a subscriber.

Mesh routers 140 can also serve as gateways to the Internet. According to one embodiment, mesh router/gateway 140 has at least one network interface, such as an ethernet controller, that is in communication with the Internet. This communication is via a communications link such as ethernet. In a mesh network 100, multiple gateways may exist.

The mesh network topology of FIG. 1 may also include a network management server 150. Network management server 150 may be connected to a mesh router 140 to access the Internet. According to one embodiment, the network management server 160 designates the channel assignments of all mesh routers 140 in the mesh network.

Figure 2:
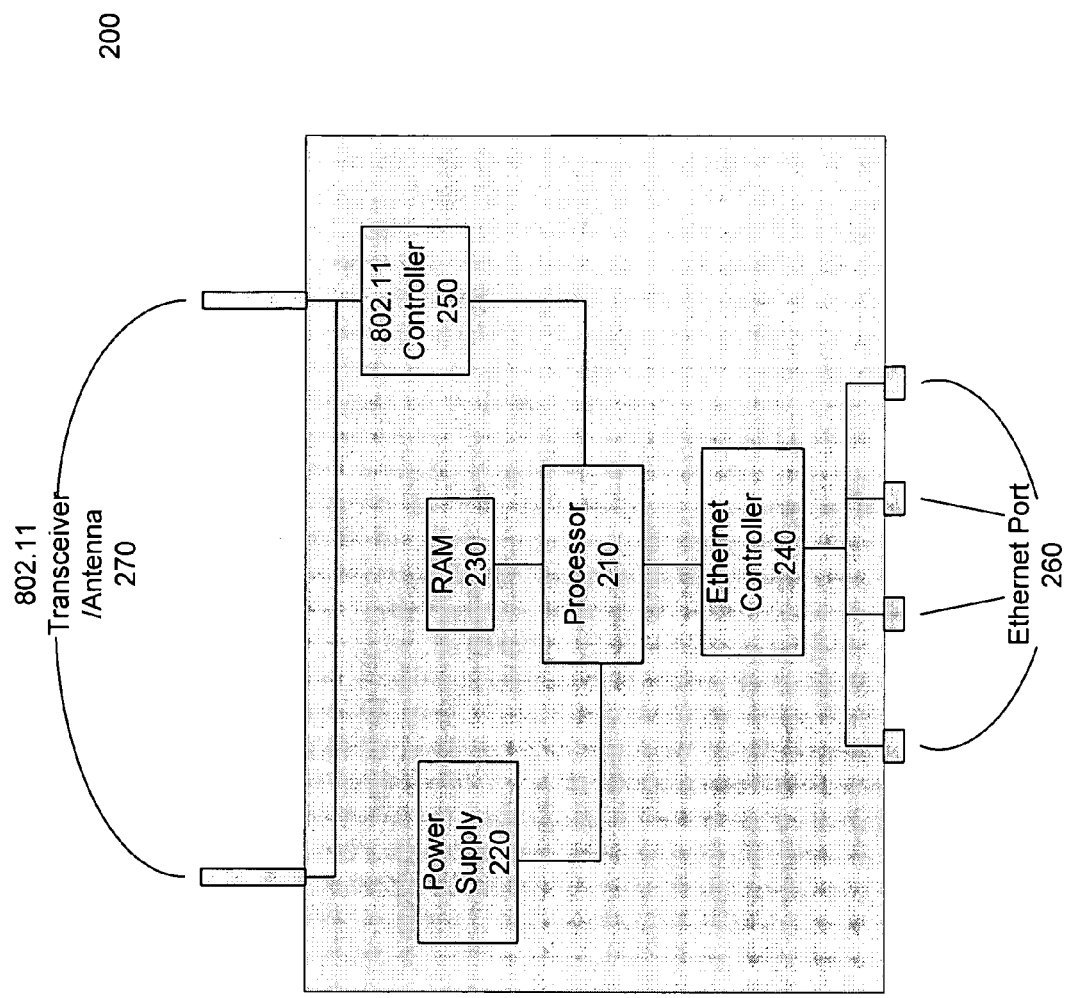
FIG. 2 illustrates a block diagram of an exemplary wireless router according to one embodiment of the present disclosure.

FIG. 2 illustrates a block diagram of an exemplary mesh router 200 according to one embodiment of the present invention. In addition to accessing the wireless network, a mesh router 200 also allows subscribers to set up their own local area networks. Wireless router 200 may be a Wi-Fi router, as is well-known in the art and available at a number of consumer retailers. The mesh router 200 has a processor 210 connected to a power supply 220, random access memory (RAM) module 230, Ethernet controller 240, and 802.11 controller 250. The Ethernet controller 240 allows the processor 210 to communicate with Ethernet port(s) 260. The 802.11 controller 250 allows the processor 210 to communicate with the 802.11 antennae 270. RAM module 230 stores a routing table 231 used to route packets to and from mesh router 200.

Figure 3:
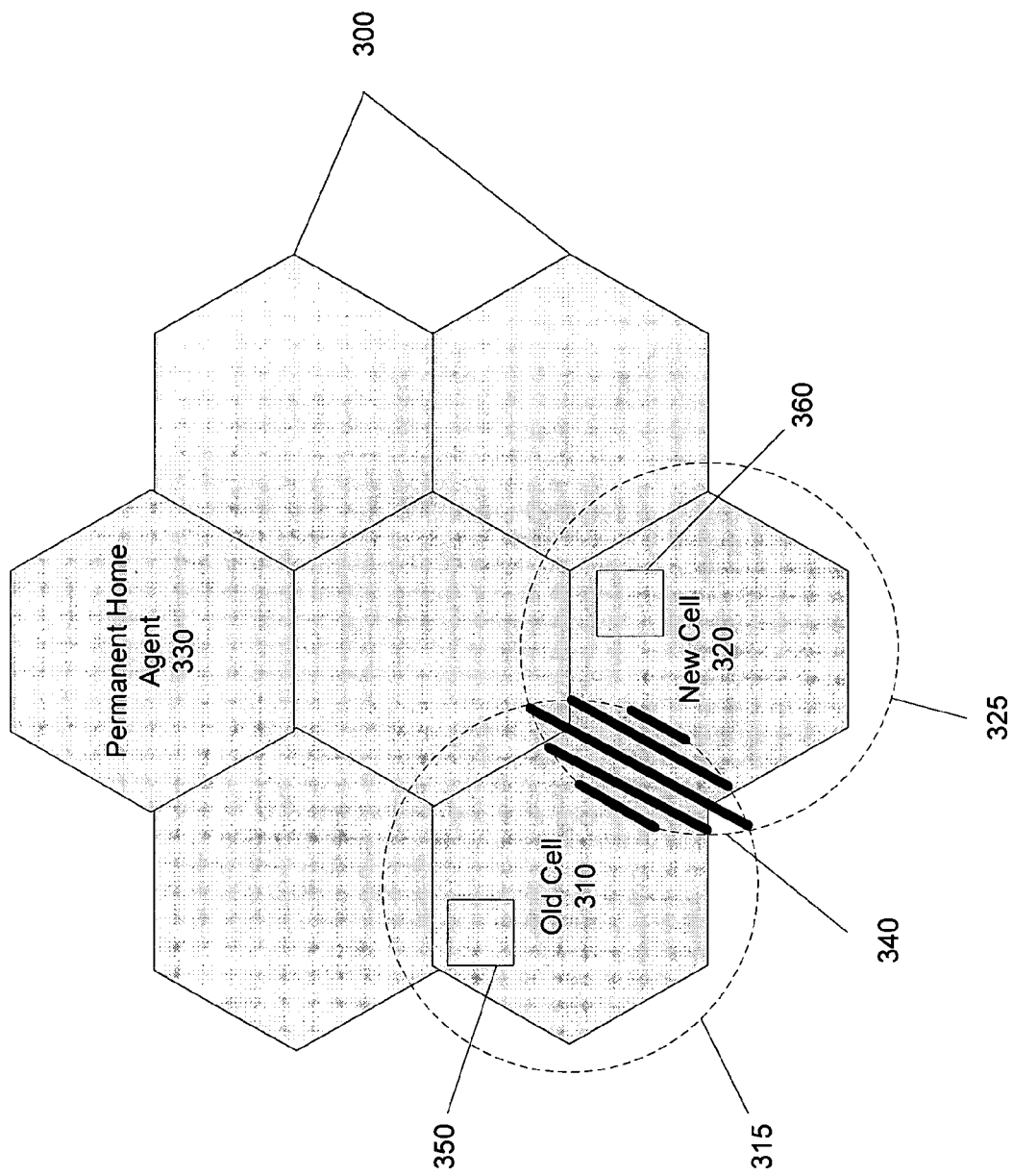
FIG. 3 illustrates roaming according to the present disclosure.

FIG. 3 illustrates roaming according to the present disclosure where a user travels from old cell 310 to new cell 320. Roaming occurs each time a user travels between different mesh router coverage areas. FIG. 3 depicts the scenario where each cell 300 has one mesh router. However, a cell may have more than one mesh router. This discussion therefore applies equally to situations where a user travels within a single cell but between different mesh routers within that cell.

A user may travel anywhere within the entire network coverage area, consisting of a multitude of cells 300. Each time the user moves from an old cell 310 to a new cell 320, the user device must roam. Instead of communicating each time with the dedicated permanent home agent 330, according to one embodiment, a proxy home agent is used. While the user is in the old cell 310, the old cell 310 requests portions of the user's roaming profile from the permanent home agent 330. In this fashion, the old cell 310 becomes a proxy home agent because it contains information necessary for roaming, such as: authentication, user name, session id, password, etc.

In FIG. 3, a mesh router 350 in old cell 310 has signal coverage area 315, and a mesh router 360 in new cell 320 has signal coverage area 325. When the user travels from old cell 310 to new cell 320, there is a period of time where the user resides in the overlap area 340. When the user is in this area, the client is seen by the routers in both old cell 310 and new cell 320. The router 350 in new cell 320 pre-fetches the roaming profile information from the Proxy Home Agent, old cell 310. This information is sufficient to complete roaming for the user if it leaves the overlap zone 340 and enters new cell 320. Once the user enters new cell 320, the new cell 320 requests portions of the roaming profile from permanent home agent 330 in preparation for the next roaming process, which is repeated when the user enters another overlap zone 340.

Roaming is initiated by a user device once it senses a stronger signal is available. This will occur only if a user enters new cell 320. Thus, if a user enters the overlap area 340 between two cells 300 but does not enter a new cell 320, roaming is never completed. According to one embodiment, new cell 320 may receive the roaming profile from old cell 310.

FIG. 3 depicts the overlap 340 between a single old cell 310 and a single new cell 320. The teachings herein also apply where there is an overlap area containing more than two cells 300. In the case that a user enters an overlap area of more than two cells 300, the roaming profile is transferred from old cell 310 to all of the new cells 320. Thus, regardless of which cell 320 the user enters, that new cell 320 will have the necessary roaming profile needed to complete roaming.

Figure 4:
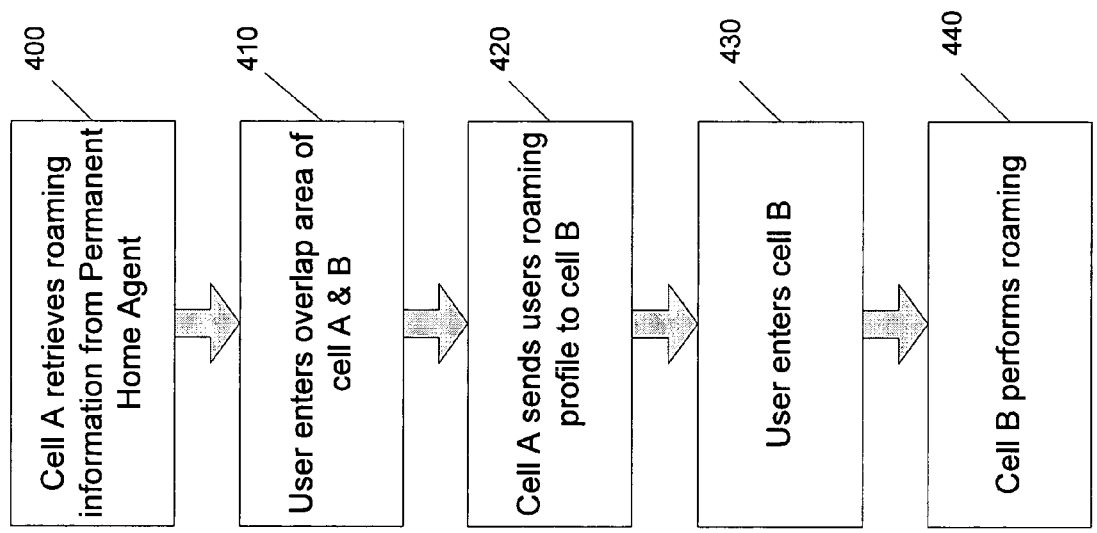
FIG. 4 is a flow chart of an exemplary process for roaming according to one embodiment of the present disclosure.

FIG. 4 is a flow chart of an exemplary process for roaming according to one embodiment of the present disclosure. The chart walks through the steps required to handoff a user from an old cell A 310 to a new cell B 320. The router in cell A 310 retrieves the user's roaming profile from the permanent home agent while the user is still in cell A 310 (400). Once that information is received, the router in cell A 310 becomes the proxy home agent. When a user enters the overlap area between old cell A 310 and new cell B 320, each of the cells identify the user and the proxy home agent (410). The router in old cell A 310 transfers the user's roaming profile to the router in new cell B 320 in preparation for roaming (420) if the user leaves the overlap area between the cells and enters new cell B 320 (430). Once the user enters new cell B 320, the router in new cell 320 B performs the roaming steps of connecting with the user device and releases the devices from old cell A 310 (44). Because the router in new cell B 320 already received the roaming profile from the proxy home agent, the router in new cell B 320 completes roaming without any communication to the permanent home agent. Once roaming is completed, the user communicates via new cell B 320.

Although the figure depicts a linear progression for a single roaming occurrence, the steps of FIG. 4 are repeated each time a user enters a new cell.

This disclosure has the benefit of tracking a user across different cells. Once a user enters a new cell, that new cell receives roaming profile information from the permanent home agent and it then becomes the proxy home agent. In this manner, it prepares for transfer of the roaming profile to any new cell that the user may travel into. The proxy home agent thus tracks the user, and changes at each roaming step. The proxy home agent is always in a neighboring cell to the present location of the user, and communication time between proxy home agent and any new cell is always a minimum.

Each node in the network interfaces with layer 2 (or L2, i.e., Link and MAC layer), and layer 3 (or L3, i.e., IP layer). The present wireless mesh network may be compatible with IEEE/IETR standards on 802.11 f (IAPP), according to one embodiment. The interface to L2 roaming (e.g., IEEE 802.11f) serves as the trigger for mobility events without intervention of client software. The distributed fashion of home agents, plus the ability to incrementally perform functions such as differential authentication, switching to new radio channel, and routing updates, make the fast handoff possible.

Yet another feature of the present method and system is multi-level roaming. Multi-level roaming involves operations across OSI layer 2 (Link Layer/MAC), and layer 3 (IP). In one embodiment, local roaming among nodes on the same IP subnet is done on layer 2. This has the advantages of fast roaming because all functions are on the same L2 and does not involve L3 (IP) layer.

The present method and system has a number of benefits over typical roaming solutions in mesh networks. Because roaming is completed with communication between neighboring cells, or one hop, handoff latency is significantly reduced. Handoff time for VoIP traffic is below 50 ms. According to one embodiment, the system requires no change to a user's device. The present mesh network roaming system is also scalable because of the minimum amount of information transferred long distances during roaming.

While the preferred embodiments of the invention have been described herein, it will be understood that those skilled in the art, both now and in the future, may make various improvements and enhancements which fall within the scope of the claims that follow. These claims should be construed to maintain the proper protection of the invention described herein.

We claim:
1. A method, comprising:
   determining when a mobile device enters an overlap region when moved from an old cell toward a new cell in a mesh network, the mesh network having a plurality of cells including the old cell and the new cell and a plurality of mobile devices including the mobile device, and each of the plurality of cells being serviced by at least one router of a plurality of routers;

retrieving a user's roaming profile associated with the mobile device from a proxy home agent collocated in a router servicing the old cell, wherein a proxy home agent database replicates a permanent home agent database in the mesh network, both the proxy home agent database and the permanent home agent database containing roaming profiles associated with the plurality of mobile devices including the user's roaming profile, and association information of the plurality of mobile devices with the plurality of routers;

authorizing the mobile device to associate with the proxy home agent collocated in the router servicing the old cell without querying the permanent home agent for a security association;

transferring in a single hop the user's roaming profile from the router servicing the old cell to a router servicing the new cell, while the mobile device is located within the overlap region;

updating association information between the mobile device and the routers servicing the old cell and the new cell in the proxy home agent database prior to updating the association information in the permanent home agent database;

synchronizing the updated association information between the mobile device and the routers servicing the old cell and new cell in the permanent home agent database;

maintaining the proxy home agent with the mobile device while the mobile device is registered in the mesh network; and tracking the mobile device with the proxy home agent by moving the proxy home agent to the router servicing the new cell.

2. The method according to claim 1 wherein determining when a mobile device enters an overlap region comprises:
identifying neighboring routers that detect the mobile device's presence; and
labeling the region where the mobile device can be seen by more than one router the overlap region.

3. The method according to claim 1 wherein the router servicing the old cell is connected to a server storing a plurality of roaming profiles.

4. The method according to claim 1 wherein the user's roaming profile comprises:
an authentication code;
a user name;
a session id; and
a password.

5. The method according to claim 1 further comprising:
identifying a first cell where the mobile device is first registered with the mesh network; and
associating the mobile device with a home agent located collocated in a router servicing the first cell, wherein the home agent stores the users s roaming profile and tracks the mobile device.

6. The method according to claim 5 further comprising:
retrieving the user's roaming profile from the proxy home agent if transferring the user's roaming profile from the router servicing the old cell to the router servicing the new cell fails.

7. The method according to claim 1, further comprising:
retrieving the user's roaming profile from the gateway home agent if transferring the user's roaming profile from the router servicing the old cell to the router servicing the new cell fails.

8. The method according to claim 1, wherein the external network comprises a wired network, a wireless network and another mesh network.

9. The method according to claim 1 further comprising:
determining when the mobile device enters an overlap area of a first region and a second region in the mesh network, wherein the overlap area is covered a first cell of the first region and a second cell of the second region;
retrieving the user's roaming profile associated with the mobile device from a first permanent home agent of the first region, the first permanent home agent has a first permanent home agent database containing roaming profiles associated with a first plurality of mobile devices in the first region and association information of the first plurality of mobile devices with a first plurality of routers servicing the first region;
updating the user's roaming profile associated with the mobile device in a second permanent home agent of the second region, the second permanent home agent has a second permanent home agent database containing roaming profiles associated with a second plurality of mobile devices in the second region and association information of the second plurality of mobile devices with a second plurality of routers servicing the second region;
transferring the user's roaming profile from the first permanent home agent of the first region to the second permanent home agent of the second region, while the mobile device is located within the overlap area between the first region and the second region;
transferring a security association between the first permanent home agent and the mobile device to the second permanent home agent of the second region when the mobile device enters the second cell of the second region;
synchronizing the second permanent home agent database and a second proxy home agent database collocated in the second cell of the second region;
maintaining the second proxy home agent with the mobile device while the mobile device is registered in the second region of the mesh network; and
tracking the mobile device with the second proxy home agent in the second region of the mesh network by moving the second proxy home agent in other cells servicing the mobile device in the second region.

10. The method according to claim 9, wherein the user's roaming profile contains information about Internet Protocol (IP) layer of the mobile device.

11. The method according to claim 9, wherein the first region and the second region of the mesh network use different IP subnet.

12. A mesh network, comprising:
a permanent home agent having a permanent home agent database;
a proxy home agent having a proxy home agent database replicating the permanent home agent database;
a plurality of mobile devices;
a plurality of cells, further comprising:
an old cell in which a mobile device exists;
a new cell toward which the mobile device moves; and
an overlap region in which the mobile device is detected by the old cell and the new cell; and a plurality of routers servicing the plurality of cells comprising a router servicing the old cell and a router servicing the new cell, wherein:
- a user's roaming profile associated with the mobile device is retrieved from the proxy home agent collocated in the router servicing the old cell, wherein the proxy home agent database contains roaming profiles associated with the plurality of mobile devices including the user's roaming profile, and association information of the plurality of mobile devices with the plurality of routers;
- the mobile device is authorized to associate with the proxy home agent collocated in the router servicing the old cell without querying the permanent home agent for a security association;
- the router servicing the old cell transfers in a single hop a user's roaming profile to the router servicing the new cell while the mobile device is within the overlap region;
- association information between the mobile device and the routers servicing the old cell and the new cell is updated in the proxy home agent database prior to being updated in the permanent home agent database;
- the updated association information between the mobile device and the routers servicing the old cell and the new cell is synchronized in the permanent home agent database;
- the proxy home agent is maintained with the mobile device while the mobile device is registered in the mesh network; and
- the mobile device is tracked with the proxy home agent by moving the proxy home agent from the router servicing the old cell to the router servicing the new cell.

13. The mesh network according to claim 12 further comprising a network management server for designating channel assignments of the routers.

14. The mesh network according to claim 12 wherein the user's roaming profile comprises:
- an authentication code;
- a user name;
- a session id; and
- a password.

15. The mesh network according to claim 12 wherein the router servicing the old cell is connected to a server storing a plurality of roaming profiles.

16. The mesh network according to claim 12 further comprises:
- a first cell where the mobile device first registers with the mesh network; and
- a home agent located collocated in a router servicing the first cell, wherein the home agent stores the user's roaming profile and tracks the mobile device.

17. The mesh network according to claim 16, wherein:
the router servicing the new cell retrieves the user's roaming profile from the proxy home agent if transferring the user's roaming profile from the router servicing the old cell to the router servicing the new cell fails.

18. The mesh network according to claim 12, wherein the router servicing the new cell retrieves the user's roaming profile from the gateway home agent if transferring the user's roaming profile from the router servicing the old cell to the router servicing the new cell fails.

19. The mesh network according to claim 12, wherein the external network comprises a wired network, a wireless network and another mesh network.

20. The mesh network according to claim 12 further comprises:
- a first region having more than one cells;
- a second region having more than one cells;
- an overlap area of the first region and the second region;
- a first permanent home agent servicing the first region and having a first permanent home agent database containing roaming profiles associated with a first plurality of mobile devices in the first region and association information of the first plurality of mobile devices with a first plurality of routers servicing the first region; and
- a second permanent home agent servicing the second region and having a second permanent home agent database containing roaming profiles associated with a second plurality of mobile devices in the second region and association information of the second plurality of mobile devices with a second plurality of routers servicing the second region,
- wherein, when the mobile device exits a first cell of the first region and enters a second cell of the second in the overlap area, the user's roaming profile associated with the mobile device is retrieved from the first permanent home agent of the first region;
- wherein the user's roaming profile is transferred from the first permanent home agent of the first region to the second permanent home agent of the second region, while the mobile device is located within the overlap region between the first region and the second region;
- wherein a security association between the first permanent home agent and the mobile device is transferred to the second permanent home agent of the second region when the mobile device enters the second cell of the second region;
- wherein the second permanent home agent database is synchronized with a second proxy home agent database collocated in the second cell of the second region;
- wherein the second proxy home agent is maintained with the mobile device while the mobile device is registered in the second region; and
- wherein the mobile device is tracked with the second proxy home agent in the second region by moving the second proxy home agent in other cells servicing the mobile device in the second region.

21. The mesh network according to claim 20, wherein the user's roaming profile contains information about Internet Protocol (IP) layer of the mobile device.

22. The mesh network according to claim 20, wherein the first region and the second region of the mesh network use different IP subnet.

* * * * *

UNITED STATES PATENT AND TRADEMARK OFFICE
CERTIFICATE OF CORRECTION

| | | |
|---|---|---|
| PATENT NO. | : 7,711,361 B2 | Page 1 of 1 |
| APPLICATION NO. | : 11/286069 | |
| DATED | : May 4, 2010 | |
| INVENTOR(S) | : Xiao-Dong Frank Wang et al. | |

It is certified that error appears in the above-identified patent and that said Letters Patent is hereby corrected as shown below:

On the title page

Item (54) delete the word "ON" and insert the word --IN--

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 7,711,361 B2
APPLICATION NO. : 11/286069
DATED : May 4, 2010
INVENTOR(S) : Xiao-Dong Frank Wang et al.

Page 1 of 1

It is certified that error appears in the above-identified patent and that said Letters Patent is hereby corrected as shown below:

On the title page, Item (54) and at Column 1, line 3.

Delete the word "ON" and insert the word --IN--

This certificate supersedes the Certificate of Correction issued May 1, 2012.

Signed and Sealed this
Twenty-ninth Day of May, 2012

David J. Kappos
*Director of the United States Patent and Trademark Office*